(12) United States Patent
Iliffe-Moon et al.

(10) Patent No.: US 11,474,678 B2
(45) Date of Patent: Oct. 18, 2022

(54) METHOD, AN APPARATUS, AND A MACHINE-READABLE MEDIUM FOR DISPLAYING INFORMATION

(71) Applicant: Bayerische Motoren Werke Aktiengesellschaft, Munich (DE)

(72) Inventors: Etienne Iliffe-Moon, Menlo Park, CA (US); Brian Mok, Santa Clara, CA (US); Iris Koser, San Carlos, CA (US); Wei Wang, San Francisco, CA (US); Daniel Grein, Novato, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/722,643

(22) Filed: Dec. 20, 2019

(65) Prior Publication Data
US 2021/0191604 A1    Jun. 24, 2021

(51) Int. Cl.
| | |
|---|---|
| *G06F 3/04845* | (2022.01) |
| *G06F 3/04815* | (2022.01) |
| *B60K 35/00* | (2006.01) |
| *G06F 3/04883* | (2022.01) |
| *G06F 3/0484* | (2022.01) |

(52) U.S. Cl.
CPC ......... *G06F 3/04845* (2013.01); *B60K 35/00* (2013.01); *G06F 3/04815* (2013.01); *G06F 3/04883* (2013.01); *B60K 2370/1438* (2019.05)

(58) Field of Classification Search
CPC .............. G06F 3/0482; G06F 3/04845; G06F 3/04815; G06F 3/04883; B60K 35/00; B60K 2370/1438
See application file for complete search history.

(56) References Cited

U.S. PATENT DOCUMENTS

| | | | | |
|---|---|---|---|---|
| 6,323,859 | B1* | 11/2001 | Gantt | G06T 19/20 345/419 |
| 6,462,733 | B1* | 10/2002 | Murakami | G06F 3/033 345/184 |
| 6,903,723 | B1* | 6/2005 | Forest | G06F 3/0483 345/157 |
| 10,284,794 | B1* | 5/2019 | Francois | H04N 5/3415 |
| 10,659,405 | B1* | 5/2020 | Chang | G06F 3/0481 |
| 2004/0085258 | A1* | 5/2004 | Piccionelli | H05B 47/165 345/2.1 |
| 2007/0258849 | A1* | 11/2007 | Kent | A61L 9/145 422/123 |
| 2011/0294579 | A1* | 12/2011 | Marks | H04N 13/10 463/36 |

(Continued)

FOREIGN PATENT DOCUMENTS

| | | |
|---|---|---|
| EP | 1184083 A1 | 3/2002 |
| WO | 2018022562 A1 | 2/2018 |

(Continued)

*Primary Examiner* — Nicholas Augustine
(74) *Attorney, Agent, or Firm* — 2SPL Patent Attorneys PartG mbB; Kieran O'Leary

(57) ABSTRACT

Embodiments generally relate to a method, an apparatus, and a machine-readable medium for displaying information. In particular, embodiments relate to a method comprising generating an interface object in a virtual space, and displaying the information by changing a shape and an orientation of the interface object.

21 Claims, 11 Drawing Sheets

(56) References Cited

U.S. PATENT DOCUMENTS

| | | | |
|---|---|---|---|
| 2012/0057850 A1* | 3/2012 | Klappert | H04N 21/6582 386/278 |
| 2012/0166472 A1* | 6/2012 | Hoppenot | G06F 16/532 707/769 |
| 2012/0249741 A1* | 10/2012 | Maciocci | G06T 19/006 348/51 |
| 2013/0017519 A1* | 1/2013 | Leshed | G09B 19/00 434/238 |
| 2015/0355805 A1* | 12/2015 | Chandler | G06F 3/0482 715/784 |
| 2016/0018886 A1* | 1/2016 | Song | G06F 3/017 715/757 |
| 2017/0091983 A1* | 3/2017 | Sebastian | G06T 15/205 |
| 2017/0139556 A1* | 5/2017 | Josephson | H04L 12/2803 |
| 2017/0173203 A1* | 6/2017 | Becker | A61L 9/122 |
| 2017/0351668 A1* | 12/2017 | Milan | G06F 16/24578 |
| 2019/0121522 A1* | 4/2019 | Davis | H04N 9/3147 |
| 2019/0250601 A1* | 8/2019 | Donahoe | G05D 1/101 |

FOREIGN PATENT DOCUMENTS

| | | |
|---|---|---|
| WO | 2019030771 A1 | 2/2019 |
| WO | 2019154328 A1 | 8/2019 |

\* cited by examiner

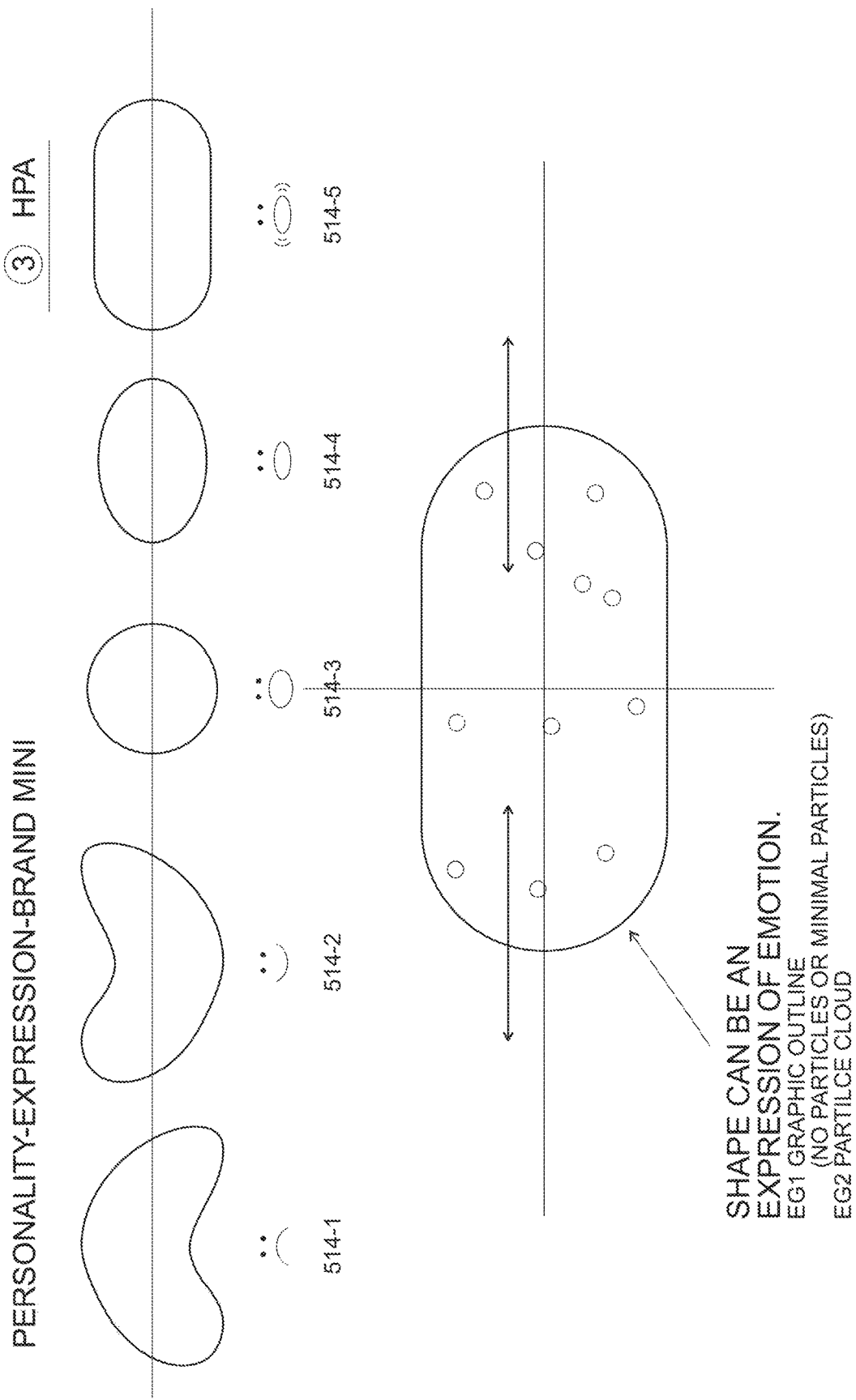

METHOD, AN APPARATUS, AND A MACHINE-READABLE MEDIUM FOR DISPLAYING INFORMATION

FIELD

Embodiments generally relate to a method, an apparatus, and a machine-readable medium for displaying information. In particular, embodiments relate to a concept for displaying information about a stimulant.

BACKGROUND

The human body is affected by its sense of smell. Leveraging a person's sense of smell can cause both physiological and psychological effects. It can also affect the sensory system as a whole. A smell can alter a person's emotion, mood, memory, and perception. And, in turn, how a person perceives a smell can be influenced by the other senses in interesting ways.

Many industries, including the automotive industry, have only slowly incorporated a sense experience into their alert mechanisms. A common problem with stimulant producing apparatuses, such as air fresheners, is describing and expressing the behavior of the scent in the air to a user. Hence, there may be a desire for an improved interaction model that can describe and control a rich sensory experience.

SUMMARY

Embodiments generally relate to a method, an apparatus, and a machine-readable medium for displaying information. According to an embodiment, a method for displaying information comprises generating an interface object in a virtual space. The method further comprises displaying the information by changing a shape and an orientation of the interface object. The interface object displays visual information about a subject that does not present visually in the physical world. Displaying the interface object may help people or users understand information about something that does not have a physical form by changing the shape, size, and orientation of the object and in both uniform and non-uniform ways.

The information may comprise information on an at least one stimulant. For a stimulant like a scent, the interface may be used to describe and explain the perceived arrival, presence, and dissemination of the scent or fragrance in the air. The interface establishes a relationship between visual behavior of the interface and key aspects of the scent experience including its perceived delivery, behavior, dispersion, diffusion, and bloom in the air. The interface may help people understand what they are smelling more concretely by using motion graphics to describe the scent, its aroma, and its character.

A stimulant may affect at least one human sense such as the visual, auditory, tactile, gustatory, olfactory, vestibular, or proprioceptive senses. The method may benefit those sensory inputs or experiences that cannot be visually represented easily. An abstract representation of information establishes a relationship between visual behavior of the interface object and key aspects of the stimulant allowing the user to better understand how it affects their environment. This can be true for visual stimulants as well, such as mood lighting, where the interface shows visual changes of the lighting (e.g. its brightness, its color, its warmth).

Information may comprise time, function, status, or progress information. By representing time, status, or progress the interface may allow a user to understand how long a sensory input, like a smell, persists in an environment, how it interacted with the environment since it was released, and whether any of the stimulant is still present in the environment. Time, status, or progress information can also show how much of an action, such as the changing of temperature or scent, is accomplished and how much time remains until it will be completed.

A first dimension of the interface object may relate to the information on time, status, or progress, and the displaying of the information on time, status or progress may comprise adjusting the orientation of the interface object along the first dimension. By linking a dimension of the interface object to time or progress a user may return to previous time periods and inspect the status of the stimulant at that time or issue a command that allows the stimulant to be redelivered at present in the same manner as it was during that previous time.

The interface object may be a mutable three-dimensional figure represented by a plurality of particles. By representing the object as two-dimensional (2D) or three-dimensional (3D) particles the interface can more accurately show the mixing of two different items of stimulant information at a single time, such as the mixing of two scents by showing each scent as a different color.

Representing the interface object as particles allow more information to be given about the stimulant and allows a better visual representation of how two different stimulant items, like two different scents, interact. The mutability or changeability of the particles and the interface object allows the particles and object to be modified overtime to reflect new information in real-time.

The interface object or particles may comprise at least one of element of the group of a color, shape, speed, dynamic of motion, or brightness. These elements may allow more information to be conveyed visually to the user. For example, different particles may have different dynamics of motion. Rapidly moving particles displaying an exciting or fresh scent like citrus; whereas, slow-moving particles could represent a calming scent like lavender.

The interface object may be projected on an at least one two-dimensional display. The interface object may be projected on any number of two-dimensional displays so that it can represent information on conventional digital displays and touch screens, digital projectors, or virtual reality (VR), mixed reality (MR), and augmented reality (AR) displays.

The method may further comprise the shape and the orientation of the interface object based on an at least one input. A user may interact with the interface object to inspect the information, including information that is not currently visible based on the orientation of the object. By allowing the user to adjust the object, the object may be able to store more information or only selectively show certain information. The user may access the full breadth of information by manipulating the object to reveal or rediscover it. For example, less detailed information may be displayed by the interface object that is zoomed out, and more information may be shown as the user zooms the object in. For another example, current, recent, or ongoing information may be shown by the interface object and past, old, or elapsed information may be obtained as the user rotates the object along a timeline.

Manipulating the orientation of the interface object may comprise adjusting a pitch, roll, yaw, size, perspective, or location of the interface object in a virtual space. A 3D object in a virtual space has many more degrees of freedom than a 2D object on a flat plane. This allows for many more methods of interaction than are possible with a 2D interface object. Additional methods of interaction also reduce the number of menus that a user may use, allowing for a smoother and less distracting interface experience. This may be important when a user is using the interface in an environment that demands minimal distractions, such as while operating a vehicle or heavy machinery.

Manipulating the orientation of the interface object may also comprise adjusting the camera or viewfinder of the graphical user interface that displays the object. Adjusting pan, zoom, tilt, dolly, truck, pedestal, or rack focus of a camera in a virtual space may produce similar effects to the direct manipulation of the object. For example, the perception that an object is rotating can be similarly achieved if the object itself is rotating or if the camera is rotating around the object.

Manipulating the interface object may trigger an action related to the information the interface object is displaying. A user may interact with the interface object to execute actions based on the information that the interface object displays.

The interface may display the information related to the action by changing the shape and the orientation of the interface object. This allows the interface object to be updated in real-time and display information that was just triggered by the user's manipulations.

The method might be stored on a non-transitory machine-readable medium storing instructions that, when executed by a computer, cause a computer to execute a graphical user interface. The graphical user interface comprises an interface object in a virtual space, wherein information is displayed with the interface object by changing a shape and an orientation of the interface object and wherein the shape and the orientation of the interface object is manipulated based on an at least one input. Using a non-transitory machine-readable medium allows the interface to be performed on new and existing computer-controlled systems. This means that the method can be performed on systems that are not specialty manufactured or that previously did not perform the method. Using software allows these systems to be enabled or updated to use the method.

Further, the method might be performed by an apparatus for displaying information. The apparatus comprises an input and an output interface and a processor in connection with the input and the output interfaces. The processor is configured to generate an interface object in a virtual space, change a shape and an orientation of the interface object based on information, transmit display information on the shape and orientation interface object via an output interface, receive manipulation information via an input interface, and manipulate the shape and the orientation of the interface object based on the manipulation information. Using an apparatus to perform the method allows for the interface method to be performed in environments that are not equipped to perform the method with their standard onboard systems.

The apparatus the input and the output interfaces may be in connection with a touchscreen display. Using a touch screen display allows the user to directly manipulate the interface object by directly touching the representation of the object projected on the touchscreen. This approach is not limited to touchscreens, and also applies to any gesture based interaction. For example, touch gesture recognition can be used in conjunction with any surface, such as with a digitally projected interface (on any surface of the cabin, objects in the cabin or even body (or bodies) of cabin occupants) or mid-air gesture recognition in conjunction any interface (e.g. digital screen, digitally projected interface, AR/MR/VR interface).

A vehicle may comprise the apparatus. Using this apparatus in a vehicle may allow for a stimulant to be controlled by the user in a way that is less distracting than using menus or other input devices. This apparatus may also be useful when the number or options, settings, or configurations are too numerous or complex to be captured by a menu or sub-menu structure and still be user friendly. This apparatus may be particularly suited to systems where intelligent automation is helpful in reducing complexity for the user, yet still giving the user an element of actual or perceived control.

The method may comprise information that comprises of information on a transmission of an at least one stimulant, and on time, status, or progress. At least a first dimension of the interface object may relate to the information on time or progress. The interface object may be a spherical cloud represented by a plurality of particles, a particle comprising properties including a color, shape, speed, dynamic of motion, and brightness. A particle further may comprise properties including a location of the particle on a second and a third dimension of the interface object, the particle relating to the information on the at least one stimulant. Displaying of the information may comprise changing the orientation of the interface object along the first dimension, the orientation of the plurality of particles along the second and the third dimensions, and the properties of the plurality of particles. Manipulating the interface object may trigger an action related to the information that the interface object is displaying. The stimulant may be scent, climate, or sound. Using this method combines the benefit of a visual expression, which may be artistically abstracted, of sensory information and the use of interactive components to manipulate the expression of sensory experiences. Interactive components may include touch or mid-air gestures, physical controls, or remote touch panel and screen controls.

The method may comprise information on an at least one service provided by an intelligent personal assistant (IPA) and information on time, status, or progress. At least a first dimension of the interface object relates to the information on time, status, or progress, wherein the interface object is a spherical cloud represented by a plurality of particles. A particle comprises properties including a color, shape, speed, dynamic of motion, and brightness. A particle further comprises including a location of the particle on a second and a third dimension of the interface object. The particle relates to the information on the at least one service. The displaying of the information further comprises changing the orientation of the interface object along the first dimension, changing the orientation of the plurality of particles along the second and the third dimensions, and changing the properties of the plurality of particles. The manipulating of the interface object triggers an action related to the information that the interface object is displaying.

An IPA or intelligent virtual assistant (IVA) may be a software agent that performs tasks or services for an individual based on commands or questions. The method may reduce uncertainty for new users of an IPA by providing visual feedback and confirmation instant for each command or action issued by the user. The method may also reduce a user's memory demand by presenting a visual interface (or engage multiple senses in the interaction process) to interact with rather than making a user memorize a verbal list of commands. Speech-based interfaces may produce excessive cognitive memory load compared to an interface with a visual component as described by this method. Additionally, correcting errors verbally with an IPA is very difficult and potentially very frustrating for users. The IPA interface may be able to provide more complex options compared to a verbal only interface.

Additionally, an interface object might not impart human connotations—such as ethnicity, culture, language, personality, character, mood, etc.—that may subtly influence the user and their interaction with the IPA. An interface object may provide quicker interactions than verbal interfaces. Some verbal interactions can be time-consuming, especially for experienced users or over the lifetime of an apparatus performing the method of the IPA. For example, frequently used interactions, shortcuts, or yes/no responses could be better performed by a simple gesture interaction with an interface object, these could be system presets or configured and customized by the user.

The method may comprise information that comprises a plurality of classifications. The three-dimensional figure may be one of a plurality of three-dimensional figures, and the method further comprises switching the mutable or changeable three-dimensional figure based on a switch of the classification. By switching the figures used by the method more than one type of information may be displayed using the method described in this application. Changing the overall shape of the interface object may allow a user to switch between different types of stimulant information, such as scent or sound, and identify the type of information based on the object's overall shape.

Displaying the information may comprise changing a background of the virtual space. The background or scene of the virtual space may also be used to show additional information. Either information not directly pertinent to the information displayed by the interface object. Or information that contextualized the interface object. For example, changing of the background color may indicate different categories of information that are being displayed.

BRIEF DESCRIPTION OF THE DRAWINGS

Some embodiments of apparatuses and systems will be described in the following only by way of example and with reference to the accompanying figures, in which.

DETAILED DESCRIPTION

Various embodiments will now be described more fully with reference to the accompanying drawings in which some embodiments are illustrated. The thicknesses of lines, layers, and/or regions in the figures may be exaggerated for clarity.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Same or like numbers refer to like or similar elements throughout the description of the figures, which may be implemented identically or in modified form when compared to one another while providing for the same or similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations (i.e. only A, only B, as well as A and B) if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular embodiments is not intended to be limiting for further embodiments. Whenever a singular form such as "a," "an" and "the" is used, and using only a single element is neither explicitly or implicitly defined as being mandatory, further embodiments may also use plural elements to implement the same functionality. Likewise, when a functionality is subsequently described as being implemented using multiple elements, further embodiments may implement the same functionality using a single element or processing entity. It will be further understood that the terms "comprises," "comprising," "includes" and/or "including," when used specify the presence of the stated features, integers, steps, operations, processes, acts, elements, and/or components but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the embodiments belong.

Figure 1A:
FIG. 1 shows a block diagram of an embodiment of a method for displaying information.
Figure 2:
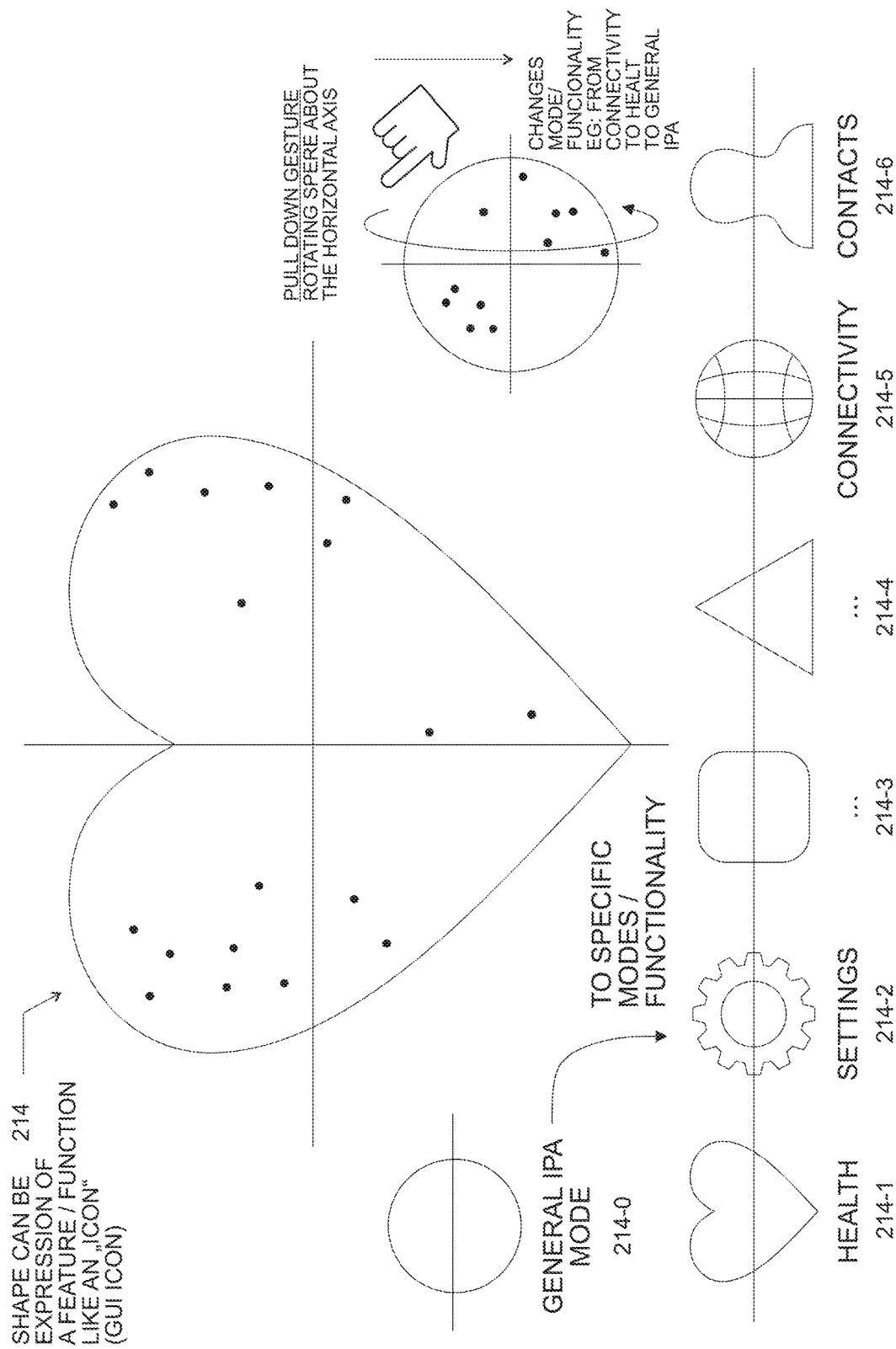
FIG. 2 shows an embodiment of the method where an interface object is a mutable three-dimensional figure.

FIG. 1a shows a block diagram of an embodiment of a method 100 for displaying information. The method 100 comprises generating 120 an interface object in a virtual space and displaying 122 the information by changing a shape and an orientation of the interface object. Information may be any information of pertinence to a user. It may include information on a vehicle, including its condition, status, circumstances, surroundings, or journey. Information may be obtained from a user, the external environment, the interior or exterior of a vehicle, the vehicle systems, or data provided by the vehicle or users. For example, information may include data on climate control systems, entertainment systems, scent dispersal systems, or intelligent personal assistant systems. An interface object is any 3D object that exists in virtual space. The object should have a height, width, and depth. The interface object may be displayed as a solid object or it may have alternative textures and motion behaviors such as a cloud, topographic or mesh texture, and elastic or viscous motion behaviors. A virtual space is any 3D background, world, or scene that comprises the interface object. Information is displayed by changing the shape, orientation, or other properties of the interface object. FIG. 2 shows examples of the interface object 214 changing shape.

The information of the method 100 of FIG. 1a may comprise information on an at least one stimulant. A stimulant may be anything that increases attention, activity, interest, motivation, or enthusiasm in a field or subject, including an emotional, psychological, or physical responses. A stimulant need not be a substance but may include light and audio signals. Stimulants can include sensory input that affects levels of physiological or nervous activity in the body. A stimulant may affect at least one human sense of the group of a visual, auditory, tactile, gustatory, olfactory, vestibular, or proprioceptive sense. A sense is the physiological capacity of humans that provides data for perception. The human nervous system has a specific sensory nervous system, and a sense organ, dedicated to each sense. The five most well-known senses include visual (sight), auditory (hearing), tactile (touch), gustatory (taste), and olfactory (smell). Additional senses may include vestibular (balance), thermoception (temperature), proprioception (spatial), or nociception (pain).

Figure 3A:
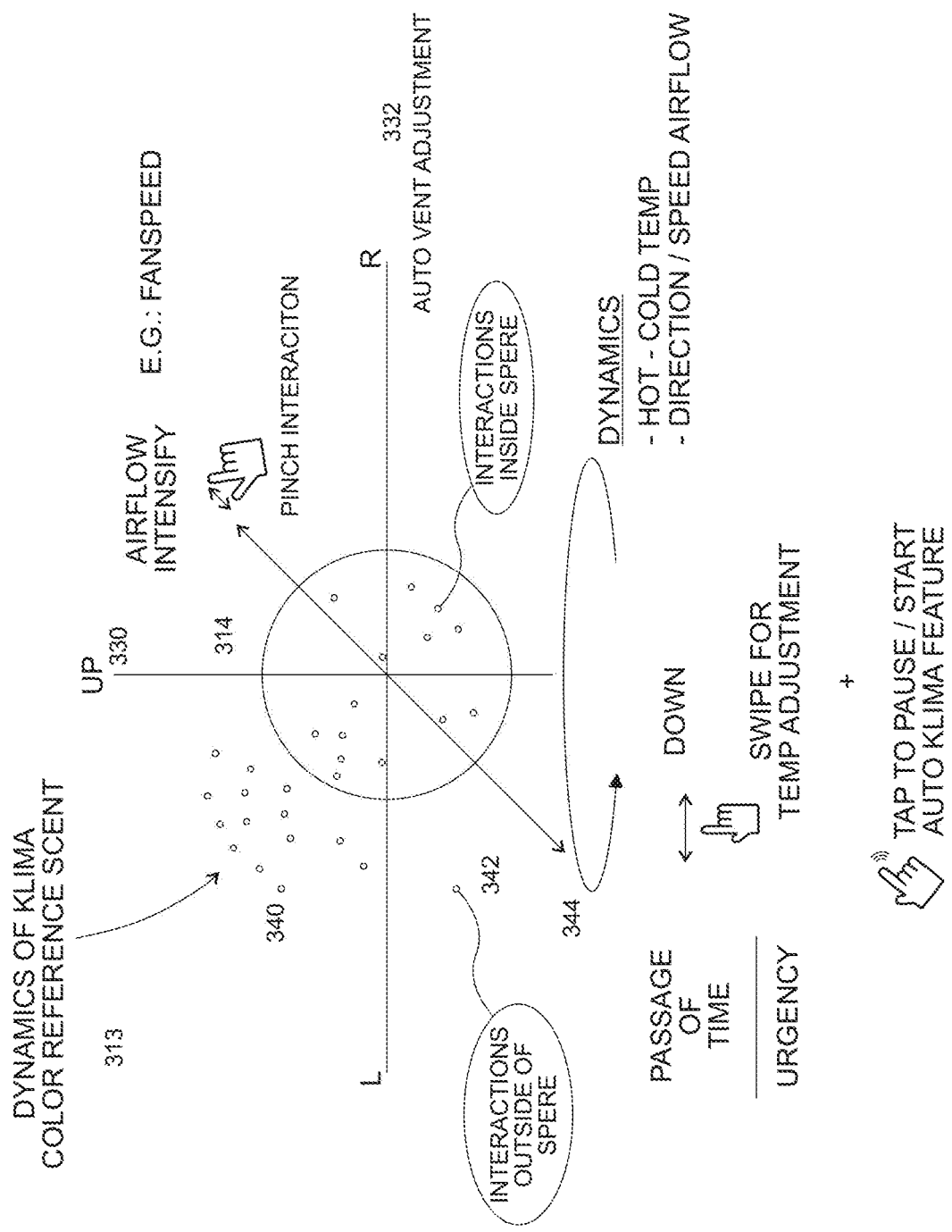
FIG. 3 shows an embodiment of the method wherein the information displayed is related to climate.

Information may further comprise information on time, status or progress. FIG. 3a shows an embodiment with an interface object 314 displaying climate information that can rotate around an axis 330. The rotation around the axis or first dimension 330 is a representation of the passage of time.

FIG. 3a shows at least a first dimension 330 of the interface object 314 relating to the information on time, status, or progress, and the displaying of the information on time, status, or progress further comprises adjusting the orientation of the interface object along the first dimension 330.

The interface object 314 displays information about actions and time. A user (including an automated system, or hybrid automated system where the user can intervene) can trigger an action, mode, service, or function at any moment in time and receive feedback on the progress or status of the system. A status may show the state (e.g. of the function or activity) at any point in time. Progress may show how much time is remaining for task completion. For example, the interface object 314 could take the shape of a heart—a representation of a heart 214-1 is shown in FIG. 2—to communicate health and wellness functionality or mode.

Figure 3B:
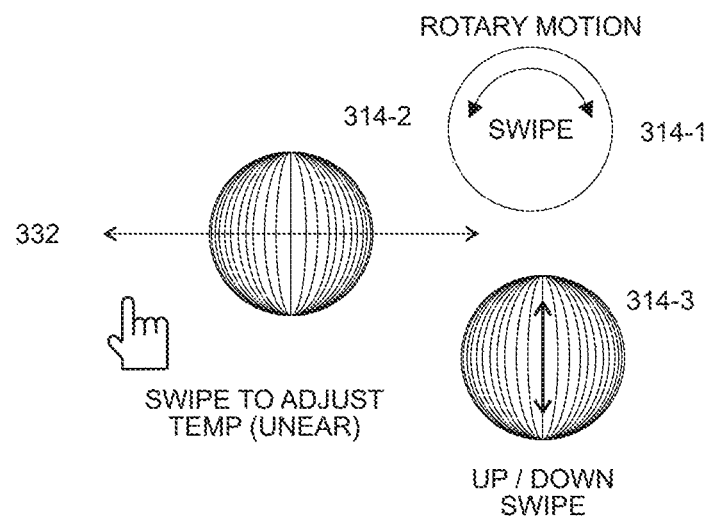
Figure 3C:
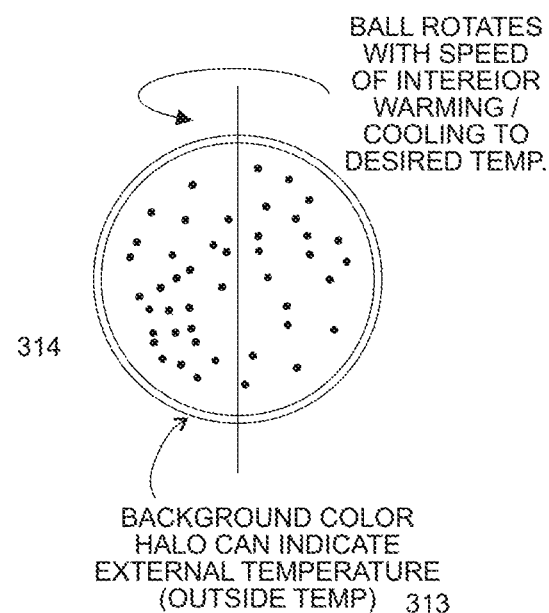
Figure 3D:
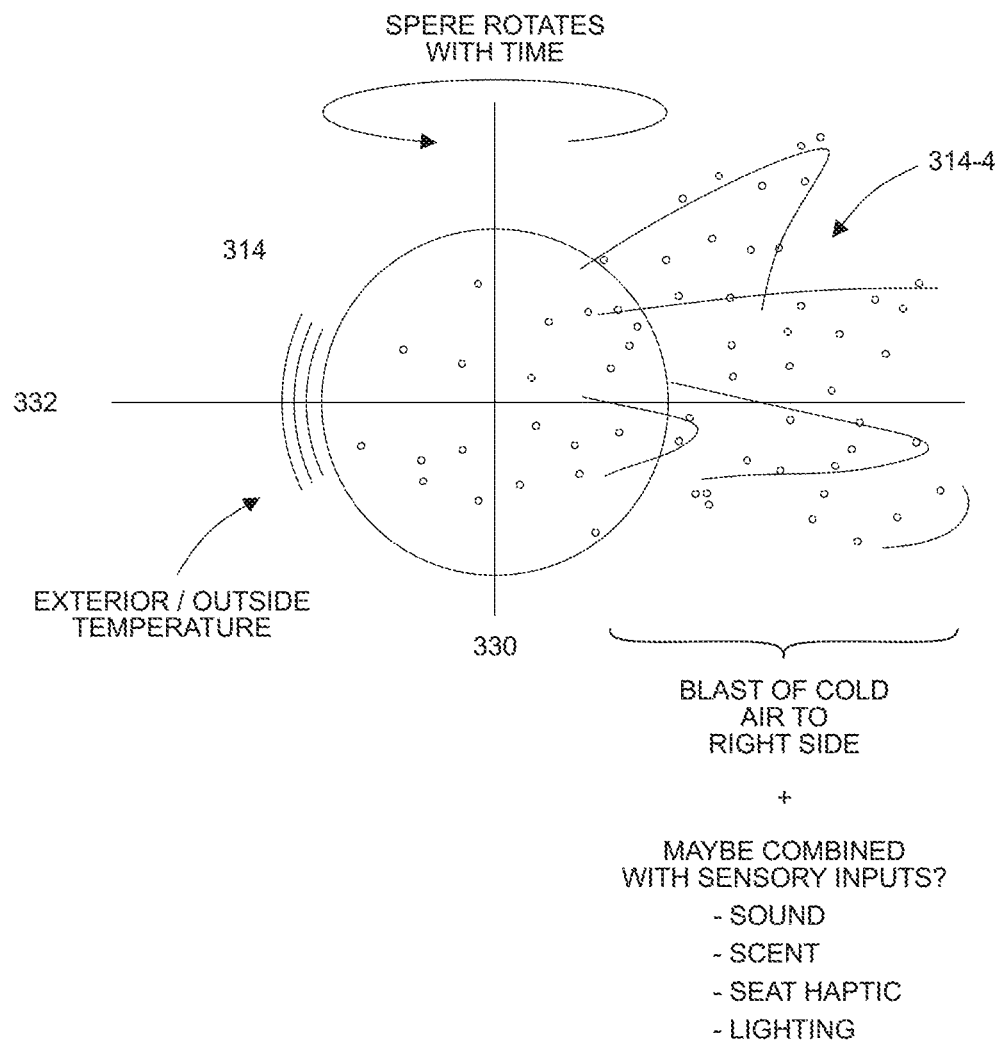
Figure 3E:
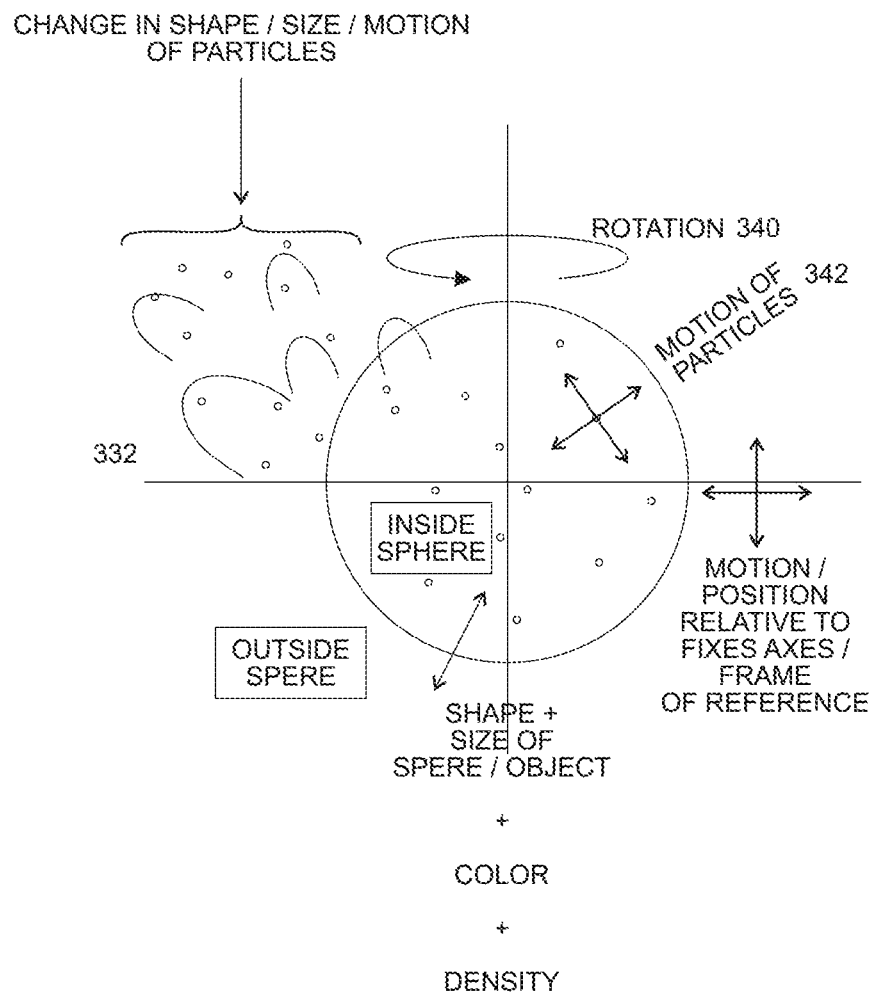

FIG. 3e shows that the interface object 314 may be a mutable three-dimensional figure represented by a plurality of particles 340. A particle 340 may be a 2D or 3D object. Particles 340 may move or swarm to form different shapes (see FIG. 2) or objects depending on the progress, status, or mode. Particles may change in shape, size or motion. Particles 340 may also have relationships with each other. Groups of particles 340 may relate to a single function, status, or progress. The relative motion, tension, or interaction between particles may be controlled by modeling physics between particles (e.g. collisions, bounce, attraction, repulsion, gravity, etc.). In FIG. 5 for example, the interface object 514 may use the motion 542 of the particle 540 cloud to communicate that an IPA is thinking. The motion of the particles may be relative to the fixed axes 330, 332, 334 of the interface object or a frame of reference.

The particles may comprise at least one element of the group of color, shape, speed, dynamic of motion, and brightness. A particle may have one or more elements or properties. These properties may distinguish the particle and its mode, status, or function from other particles. The at least one element of the interface object or particles may relate to the information. Using the elements or properties of the particle to convey information allows more dynamic information to be conveyed to the user. In a climate system, a particle's dynamics of motion may denote the speed and direction(s) at which a fan is blowing air into a vehicle cabin. Color may denote the temperature of the air introducing into the cabin. The concentration of particles and their relationship to each other may denote a concentration of a scent dispensed by a scent dispensing system. The diffusion of the particles over time representing the real-world actual or estimated diffusion of the scent in the cabin.

Figure 1B:
Figure 1C:
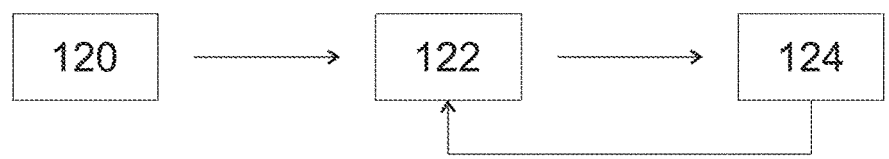
Figure 1D:
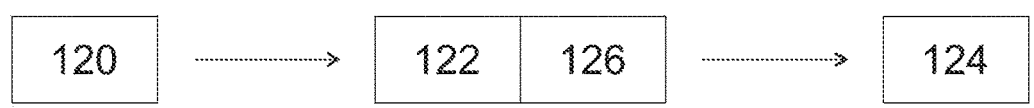

FIG. 1d shows a block diagram of an embodiment of a method 100 wherein displaying 122 the interface object comprises projecting 126 the interface object on an at least one two-dimensional display. A display may be a conventional digital display, touchscreen, VR, AR, or MR headset, digital projector, or holographic display.

FIG. 1b shows a block diagram of another embodiment of a method 100 for displaying information. The method 100 comprises generating 120 an interface object in a virtual space and displaying 122 the information by changing a shape and an orientation of the interface object. The method 100 further comprises manipulating 124 the shape and the orientation of the interface object based on an at least one input. As shown in FIG. 3b, manipulating the interface object 314 may involve rotating the interface object 314-1 about an axis 334. Rotating the interface object 314-1 may change the mode or functionality of the interface object. It may also display additional information. Other methods of manipulating may include swiping the object horizontally 314-2 or vertically 314-3.

The changing or manipulating the orientation of the interface object 314 may comprise adjusting a pitch, roll, yaw, size, perspective, or location of the interface object in a virtual space 313. Adjusting the interface object may be done through a plurality of means. For example, if an interface objected is projected onto a touch screen, manipulation can be done through pinch, flick, tap, swipe, rotation, or other gestures. Manipulation of the object does not require that the object be directly interacted with, gestures can be done in the virtual space and still affect or manipulate the object. Additionally, manipulation of the object can be done through a plurality of other methods, such as voice control, physical controls, air gestures (e.g. tracked by cameras, RADAR, etc.), or by other means.

Manipulating the interface object 314 may trigger an action related to the information the interface object is displaying. Acting by manipulating the object 314 should update the information displayed by the interface object. FIG. 1c shows the method 100 may further comprise displaying 122 the information related to the action by changing the shape and the orientation of the interface object. This may include adding information related to the gesture performed by adding to the history of actions displayed along the time axis 330. It may also include real-time animations 314-4, as shown in FIG. 3d, depicting the action performed. And it may include updating a future time axis to show progress of the action or how long it will take for an action to be completed. For example, if an interface object 314 was manipulated to increase a temperature in a vehicle cabin, the interface object could display a projected time for the cabin to reach that temperature.

Additionally, the method 100 may be performed by a program stored in a non-transitory machine-readable medium. The program causes a computer to execute a graphical user interface. The graphical user interface comprises an interface object 314 in a virtual space, wherein information is displayed with the interface object 314 by changing a shape and an orientation of the interface object 314, and wherein the shape and the orientation of the interface object is manipulated (314-1, 314-2, 314-3) based on an at least one input.

Figure 6:
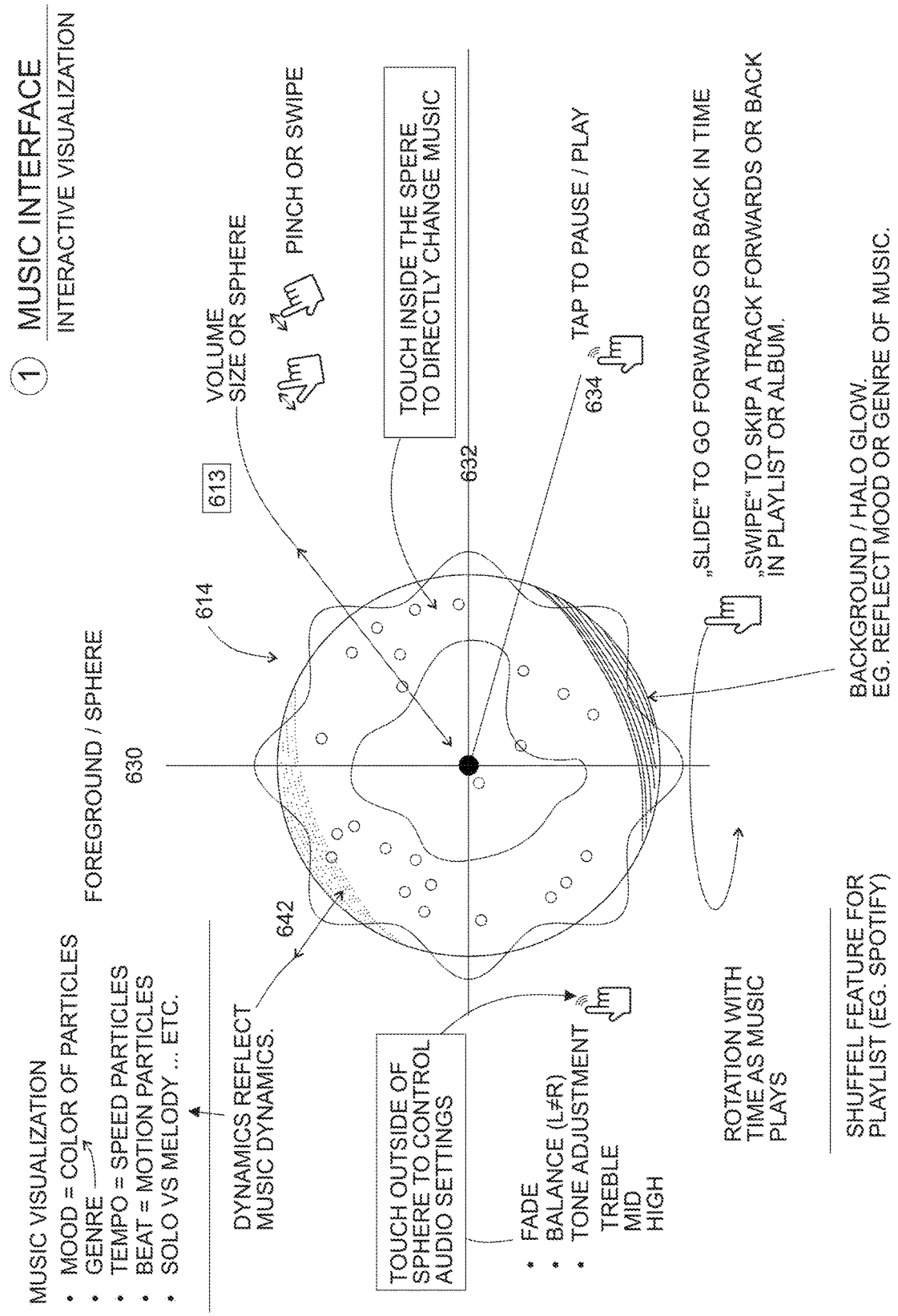
FIG. 6 shows an embodiment of the method wherein the information displayed is related to music.

FIGS. 3 and 6 show the method 100 wherein the information comprises information on transmission of an at least one stimulant, time, and function, status, or progress. At least a first dimension 330, 630 of the interface object 314, 614 relates to the information on time, status, or progress. The interface object 314, 614 is a spherical cloud represented by a plurality of particles 340, 640. A particle 340, 640 comprises properties including a color, shape, speed, dynamic of motion 342, 642, and brightness. A particle 340, 640 further comprises a location of the particle 340, 640 on a second 632 and a third dimension 334, 634 of the interface object 314, 614. The particle 340, 640 relates to the information on the at least one stimulant. The method 100 further comprises the displaying of the information by changing the orientation of the interface object along the first dimension 330, 630, the orientation of the plurality of particles 340, 640 along the second 332, 632 and the third dimensions 334, 634, and the properties of the plurality of particles 340, 640. The method 100 further comprises manipulating the interface object 314, 614 to trigger an action related to the information that the interface object 314, 614 is displaying.

FIG. 3 shows method 100 where the stimulant is a climate. The color of the particles 340 represents temperature (e.g. red for hot, blue for cold, with color gradients in between). The motion and dynamics 342 of the particles 340 express airflows, including its speed, direction, and other dynamics.

The time axis 330 may show the time required to reach the desired temperature or time response to a change in temperature. The information displayed on the interface object 314 may provide feedback to the user (e.g. urgency, such as to signify the rapid heating of a cold car in the winter) via rotation speed or gradual color change of the sphere (e.g. color gradient change from blue, signifying cold, to red, signifying hot).

Manipulating the interface object 314 may include the automatic adjustment of vents. Interaction with the interface object 314 may control the direction of the vents or airflow (i.e. automated or actuated electro-mechanical air vents). Integration of additional sensors, such as body position sensing (e.g. cabin sensors identify the position of the user such as being able to determine if the user is upright or lying flat for sleeping) may allow the vents to orientate to the user for better coverage of the user.

The color of the particles 340 of the interface object 314 may indicate temperature. For example, red may indicate hot, blue may represent cold, and a gradient between red and blue may indicate temperatures in between. Airflow, including its speed and direction, could be represented by the dynamic of motion of the particles. The time axis 330 of the interface object 314 may display past temperatures, the current temperature, and display the time it takes to reach a temperature in the future.

Gestures to manipulate the interface object 314 displaying climate information may include pinching to adjust airflow intensity (such as fan speed), rotating the interface object 314 to adjust the desired temperature, taping to start, stop, or pause, an automatic feature. Taping and dragging the virtual space 313 outside the interface object may adjust the targeting of the air with respect to a location in a vehicle.

In addition, a combination of interaction with the interface object and mid-air gestures is possible (tracked though video, RADAR, or another special tracking system). For example, a user may use a mid-air gesture to control the direction or location of the airflow (i.e. the hand gesture is the target for the automated air vents to point the airflow to), and the size of the hand gesture to control the intensity of airflow (or scent target and scent intensity in the other examples).

FIG. 3 further shows that displaying the information may further comprise changing a background of the virtual space 313. Changing the background of the space may allow for non-interactive content to be displayed giving further context to the interface object. For example, where the stimulant is a climate such as in FIG. 3c, changing the background of the virtual space 313 color may indicate an external temperature.

Additionally, changing the background of the virtual space 313 may denote which classification of information is currently displayed by the interface object. Text or different colors could correspond to each classification so that a user is better informed about which mode the interface object is currently displaying. The information displayed by the virtual space might not relate to the interface object. For instance, the virtual space may show the current time, outside temperature, weather, driving hazards, parking distance control, or other information while the interface object shows music or scent classifications. The virtual space may also show information from other classifications of the interface object, such as a current song playing, while the interface object is showing a separate classification, such as an IPA. The virtual space might show information not provided by the interface object, such as a compass direction denoted by a compass or virtual orientation of the planet or stars.

FIG. 2 further shows that the information may comprise a plurality of classifications, wherein the three-dimensional FIG. 214 is one of a plurality of three-dimensional figures, and switching the mutable three-dimensional figure is based on a switch of the classification. If the information is the status of a system or menu, the interface object 214 can change its shape to a heart 214-1 to represent a health menu, a gear 214-2 to represent a settings menu, a silhouette 214-5 to represent a contacts menu, a globe 214-6 to represent a connectivity menu. FIG. 2 additionally shows an interface object 214 in a virtual space 213 changing into a square/cube 214-3 or a triangle/pyramid 214-4; however, the shapes that the interface object 214 may take are not limited to these embodiments. Different objects or shapes may represent different modes. The shapes transition from one object to the next, creating different objects that represent different modes or functions. For example, a spherical cloud may morph into a different shape for say an IPA interface, then morph into a further shape for a sound interface. Shapes can be an expression of a feature or function, similar to an icon.

Figure 4:
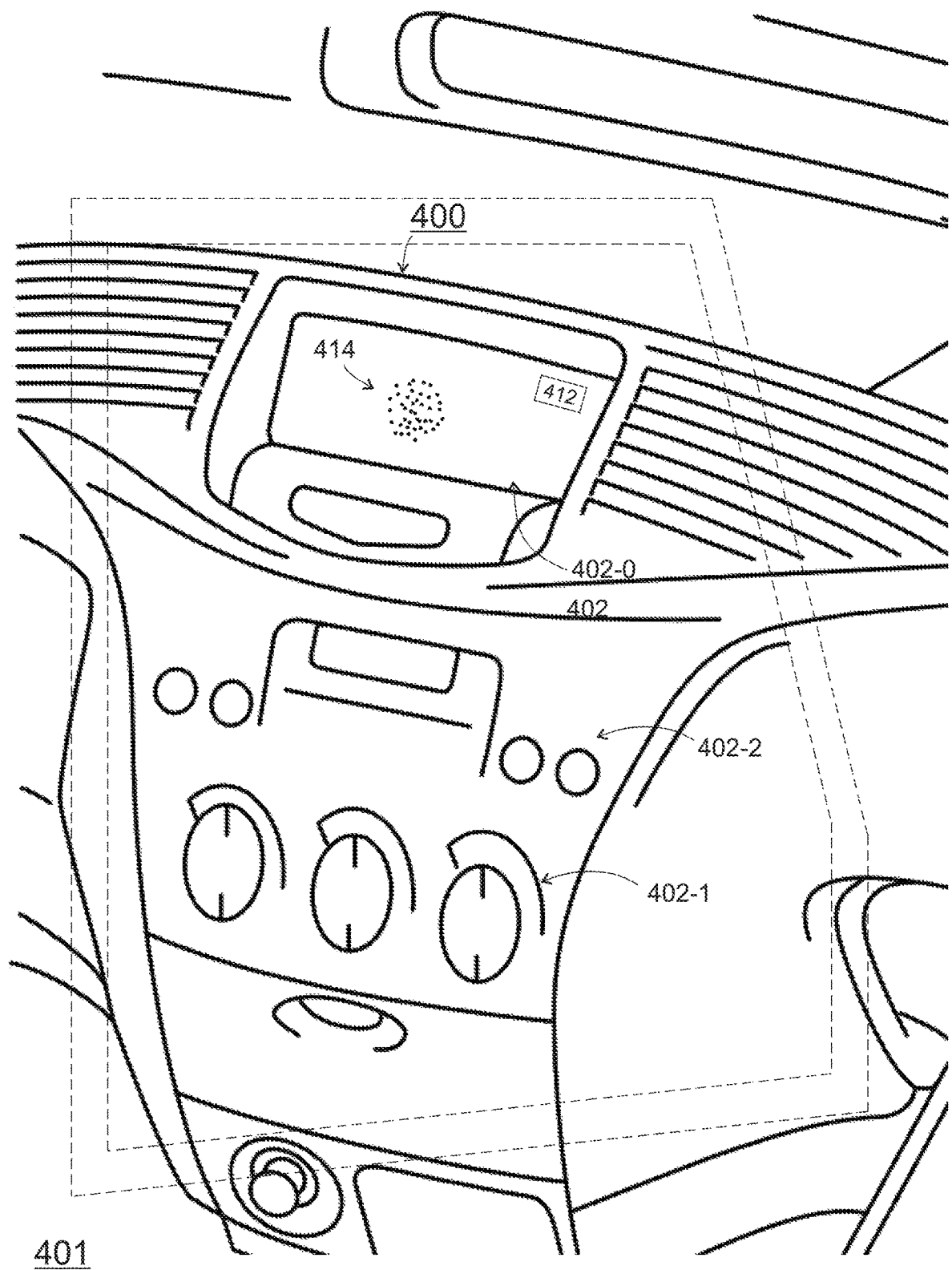
FIG. 4 shows an apparatus configured perform the method.

FIG. 4 shows an apparatus 400 for displaying information. The apparatus 400 comprises an input 402 and an output interface 404 and a processor in connection with the input 402 and the output interfaces 404. The processor is configured to generate an interface object 414 in a virtual space 413, change a shape and an orientation of the interface object 414 based on information, transmit display information on the shape and orientation interface object via an output interface 404, receive manipulation information via an input interface 402, and manipulate the shape and the orientation of the interface object 414 based on the manipulation information. The input 402 and output interfaces 404 may be the same if, for example, they comprise a touch screen with both functions.

FIG. 4 further shows the apparatus 400 wherein the input 402 and the output 404 interfaces are in connection with a touchscreen display 402-0. Additional displays may include a projector, such as one where the interface object in the virtual space can be projected onto a user's hand. FIG. 5 further shows a vehicle 401 comprising the apparatus 400. The method 100 may be displayed on a touchscreen display, video projection, virtual reality display, augmented reality display, another type of digital display technology or physical object. Interactivity or manipulation can be enabled by a touch-sensitive surface, gesture recognition or physical controller. These controls can be integrated within a car or external devices or accessories. Additional input interfaces 402 may include physical controls, such as climate dials 402-1 or entertainment controls 402-2.

Figure 5A:
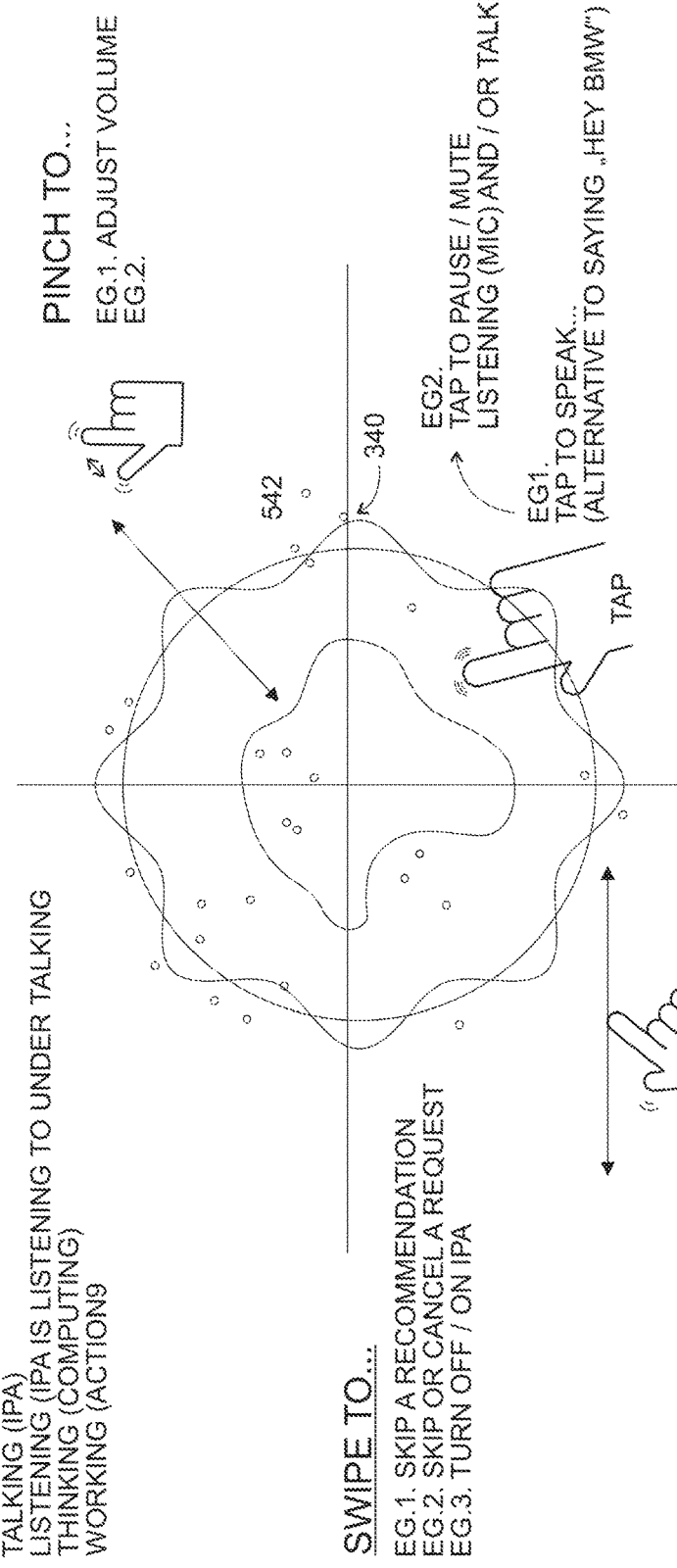
FIG. 5 shows an embodiment of the method wherein the information displayed is related to an IPA.
Figure 5A:
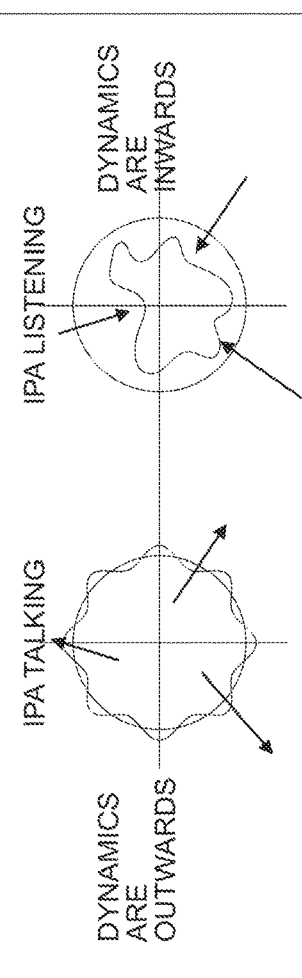

FIG. 5a shows a method 100 for an interface object that pertains to an intelligent personal assistant. The method 100 comprises information on an at least one service provided by an intelligent personal assistant and information on time, status, or progress. At least a first dimension 530 of the interface object 514 relates to the information on time, status or progress, wherein the interface object 514 is a spherical cloud represented by a plurality of particles 540. A particle 540 comprises properties including a color, shape, speed, dynamic of motion 542, and brightness. A particle 540 further comprises including a location of the particle 540 on a second 532 and a third dimension 534 of the interface object 514. The particle 540 relates to the information on the at least one service. The displaying of the information further comprises changing the orientation of the interface object 514 along the first dimension 530, changing the orientation of the plurality of particles 540 along the second 532 and the third dimensions 534, and changing the properties of the plurality of particles 540. The manipulating of the interface object 514 triggers an action related to the information that the interface object 514 is displaying.

FIG. 5b shows that the IPA interface may become a visual expression of the character or personality of the IPA 514-1-514-5 without using an avatar, animated character, or human representation. An IPA may show sadness 514-1, happiness 514-2, surprise 514-3, worry 514-5, or other expressions 514-4. Additionally, the motion 542 of the particles 540 or the interface object 514 may express the status (e.g. when the IPA is speaking, the sphere moves with the sound of the speech, or, when the IPA is thinking or processing info, the sphere moves to reflect the progress of processing, or, when the IPA is listening, the sphere motion responds to your speech, etc.).

Manipulating the IPA 514 may be done with touch interaction or gestures that provide additional functionality (e.g. shortcuts, options, settings, clarification, etc.) without requiring a user to speak to the IPA (i.e. a kind of secondary interaction modality other than speech). The interface object 514 may morph into other shapes or objects (see FIG. 2) depending on transitions to different modes or functions, yet still, be within the context of the IPA.

The IPA interface object 514 may show visual progress or status. The IPA interface 514 may provide a visual presentation of options (e.g. color, graphic, motion, etc.). Manipulating the interface 514 may be provided in ways that are very simple and intuitive for users. Simple, intuitive gestures may include using swipe to cancel and sliding to go back to a previous step or the main menu.

For example, in a vehicle the IPA interface 514 may adapt for different driving states (e.g. when driving or stationary, such as stopped at a traffic light or parked) to address issues such as distraction from the visual and cognitive load when driving. In this example, the interface object's 514 color or rotation may change in relation to whether the vehicle is moving, not moving, or the vehicle speed while moving. The interface objects' 514 or particles' 540 motion or dynamics 542 change in relationship to the vehicle speed.

The visual expression of the interface object 514 can communicate and differentiate between different modes that relate to the IPA's behavior and personality (e.g. formal vs. informal, polite vs. direct, humorous vs. somber, etc.). The shape of the interface object may denote an expression of emotion. Particles of the interface object may be reduced or enhanced in a way that may signal a change in the visual expression and character of the IPA. Some manipulations that may be provided for by the method include simple shortcuts or touch gestures such as finger tap to accept, finger slide to go back (or forwards), and swipe to cancel.

FIG. 6 shows the method 100 where the stimulant is sound. Sound is not limited to music, this information on the stimulant may apply to sound emitted by all forms of entertainment (e.g. radio, satellite radio, music, podcasts, movies, etc.). The information displayed on the interface object 614 may include volume, tempo, beat, rhythm, acoustic range, and tonality, or pitch. Manipulating the interface object 614 may include adjusting playback functionality. Playback functionality includes sequential playback of sound (e.g. ordered tracks in an album or playlist), shuffle between different sounds or songs (e.g. smart or random), or user-controlled/manual playback (e.g. skipping, scrubbing, scanning, scrolling, etc.). Manual playback is done by manipulating time of a song either by skipping, scrubbing, or jumping forward or backward (e.g. by a certain time period) through a song. Or by manipulating a playlist by moving forward or backward through a list of songs or sounds. The time axis 630 may show the duration, length, or timing during a track. Additional controls or manipulations may include the adjustment of: treble, mid, bass (equalization), stereo controls, fade (front/back), and balance (left/right).

Figure 7:
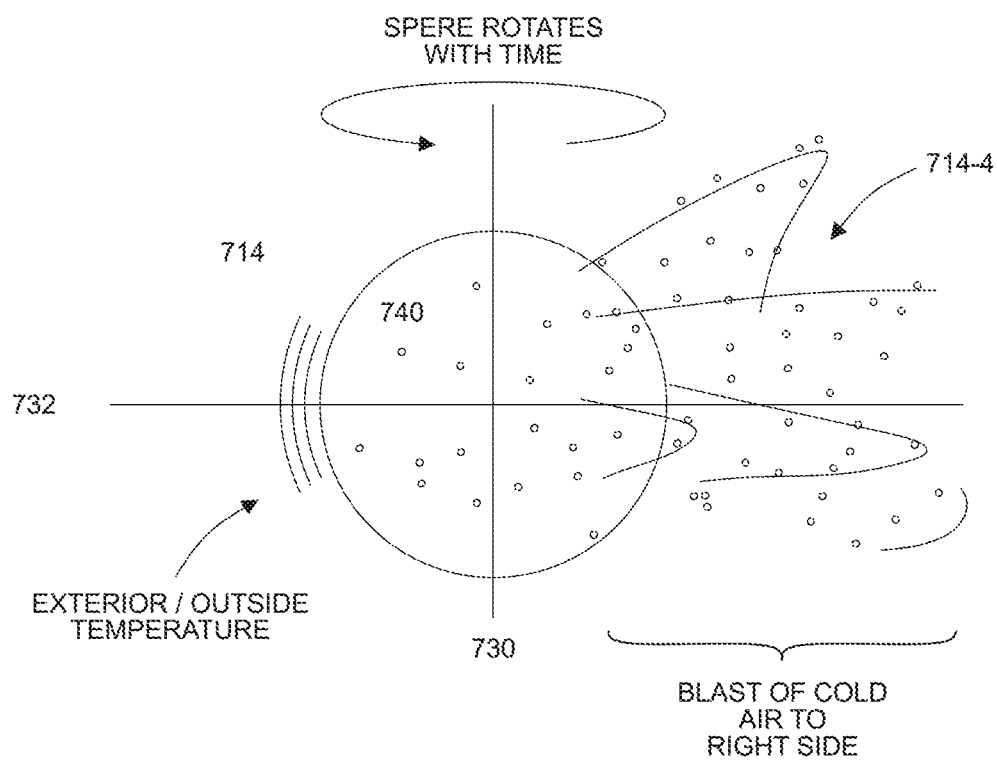
FIG. 7 shows an embodiment of the method wherein the information displayed is related to scent.

FIG. 7 shows the method 100 where the stimulant is a scent. The method 100 is controlled by an interface object 714 with a physical and gestural interaction model. The interface object 714 may describe and explain the perceived arrival, presence, and bloom of the fragrance in the air. The interface object 714 establishes a relationship between visual behaviors of the particles 740 of the interface object and the perceived scent delivery, behavior, dispersion, diffusion, and bloom in the air. A user may interact with the system by manipulating the interface object 714 to choosing scents by selecting based on color and motion graphics. The method may alter the users' perception of the scent, aroma, character, or behavior in the cabin by manipulating the color and motion graphics of the ambient interface relative to the scent delivery control parameters. The visual parameters of the particles and interface object include color (e.g. hue, saturation, and value), brightness, shape, speed, and dynamics of motion and timing of the graphical elements. The interaction model for manipulating the interface object may be based on key touch interaction gestures, such as pinching (e.g. at least a 2-finger pinch adjusts the scent intensity), swiping (e.g. at least a 1-finger swipe skips or cancels the current scent release or sequence), sliding (e.g. at least a 1-finger drag or slide changes the scent or allows the user to move backward or forwards in time) tapping (e.g. at least a single finger tap can manually release the scent). A tap could also be used to pause or stop an active scent release.

FIG. 7 further shows time and the passage of time is communicated by the rotation of the interface object and the particle clouds around a time axis 730. The interface object 714 or particles 740 may explode 714-4 when the scent is released and blooms in the air. The exploded interface object 714 may continue to rotate with time. The color of the interface object 714 or particles 740 may shift as the scent changes. Alternative versions of the interface object 740 are possible by offering different visual styles or visual treatments of the ambient interface graphics. Different visual styles may include, for example, a cylindrical object, or ribbon-like surface that rotates and unravels.

Any of the above described embodiments may be combined with any other embodiment (or combination of examples) unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

The aspects and features mentioned and described together with one or more of the previously detailed embodiments and figures, may as well be combined with one or more of the other examples to replace a like feature of the other embodiment or to additionally introduce the feature to the other embodiment.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor, or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further embodiments may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples and embodiments recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller", as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples/embodiments a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example/embodiment. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for displaying information using an interface object presented in a first, a second, and a third dimension, the method comprising:
   generating the interface object in a virtual space,
      wherein the interface object is mutable,
      wherein the interface object has a shape of a plurality of shapes, and
      wherein the virtual space comprises the first, the second, and the third dimension, and
   displaying the information by mutating the shape and changing an orientation of the interface object in the first, the second, and the third dimension,
      wherein the information comprises:
         stimulant-information on an at least one stimulant;
         a plurality of classifications of the stimulant-information; and
         temporal-information on a time, a status, or a progress of the stimulant-information, wherein each shape of the plurality of shapes relates to a classification of the plurality of classifications, and
wherein:
switching the shape of the interface object relates to a switch of the classification;
mutating the shape of the interface object relates to the stimulant-information;
at least the first dimension of the interface object relates to the temporal-information; and
the displaying of the temporal-information further comprises rotating the orientation of the interface object-about a diameter of the interface object in the first dimension to show a passage of the temporal-information.

2. The method of claim 1, wherein the at least one stimulant affects at least one human sense of the group of a visual, auditory, tactile, gustatory, olfactory, vestibular, or proprioceptive sense.

3. The method of claim 1, wherein the interface object is represented by a plurality of particles and mutating the shape of the interface object to display the information comprises adjusting a location of a particle of the plurality of particles along at least one of the diameters the of the interface object in the second and the third dimensions.

4. The method of claim 3, wherein an entirety or a subset of the plurality of particles comprise at least one element of the group of color, shape, speed, dynamic of motion, or brightness.

5. The method of claim 4, wherein the at least one element of the entirety or the subset of the plurality of particles relates to the information.

6. The method of claim 1, further comprising projecting the interface object on an at least one two-dimensional display.

7. The method of claim 1, further comprising manipulating the shape or the orientation of the interface object based on an at least one input.

8. The method of claim 7, wherein manipulating the orientation of the interface object further comprises adjusting a pitch, roll, yaw, size, perspective, or location of the interface object in the virtual space.

9. The method of claim 7, wherein manipulating the interface object triggers an action related to the information the interface object is displaying.

10. The method of claim 9, further comprising displaying additional information related to the action by changing the shape and the orientation of the interface object.

11. A non-transitory, machine-readable medium storing a program causing a computer to execute a graphical user interface for displaying information according to the method of claim 1.

12. An apparatus for displaying information using an interface object presented virtually in a first, a second, and a third dimension, the apparatus comprising:
an input and an output interface,
a processor in connection with the input and the output interfaces,
wherein the processor is configured to:
generate the interface object in a virtual space,
wherein the interface object is mutable,
wherein the interface object has a shape of a plurality of shapes, and
wherein the virtual space comprises the first, the second, and the third dimension,
mutate the shape and change an orientation of the interface object in the first, the second, and the third dimension based on information,
wherein the information comprises:
stimulant-information on an at least one stimulant;
a plurality of classifications of the stimulant-information; and
temporal-information on time, status, or progress of the at least one stimulant,
wherein each shape of the plurality of shapes relates to a classification of the plurality of classifications, and
wherein:
switching the shape of the interface object relates to a switch of the classification;
mutating the shape of the interface object relates to the stimulant-information;
at least the first dimension of the interface object relates to the temporal-information; and
the displaying of the temporal-information further comprises-rotating the orientation of the interface object-about a diameter of the interface object in the first dimension to show a passage of the temporal-information,
transmit display information on the shape and the orientation interface object via an output interface,
receive manipulation information via an input interface, and
switching the shape or the orientation of the interface object based on the manipulation information.

13. The apparatus of claim 12, wherein the input and the output interfaces are in connection with a touchscreen display.

14. A vehicle comprising the apparatus of claim 12.

15. The method of claim 7:
wherein the stimulant-information comprises information on a transmission of the at least one stimulant,
wherein one shape of the interface object is a spherical cloud represented by a plurality of particles, a particle comprising properties including a color, particle shape, speed, dynamic of motion, and brightness, the particle relating to the information on the at least one stimulant,
wherein the displaying of the information further comprises adjusting;
a location of the plurality of particles along at least one of the diameters the of the interface object in the second and the third dimensions; and
the properties of the plurality of particles, and
wherein the manipulating of the interface object triggers an action related to the information that the interface object is displaying.

16. The method of claim 15 where the stimulant is a scent.

17. The method of claim 15 where the stimulant is a climate.

18. The method of claim 15 where the stimulant is a sound.

19. The method of claim 7:
wherein the at least one stimulant of the stimulant-information comprises an at least one service provided by an intelligent personal assistant,
wherein one shape of the interface object is a spherical cloud represented by a plurality of particles, a particle comprising properties including a color, particle shape, speed, dynamic of motion, and brightness, the particle relating to the information on the at least one stimulant,
wherein the displaying of the information further comprises adjusting a location of the plurality of particles along at least one of the diameters of the interface object in the second and the third dimensions; and the properties of the plurality of particles, and wherein the manipulating of the interface object triggers an action related to the information that the interface object is displaying.

20. The method of claim 1:

plurality of shapes of the interface object is pre-defined.

21. The method of claim 1 wherein displaying the information further comprises changing a background of the virtual space.

* * * * *

UNITED STATES PATENT AND TRADEMARK OFFICE
CERTIFICATE OF CORRECTION

| | |
|---|---|
| PATENT NO. | : 11,474,678 B2 |
| APPLICATION NO. | : 16/722643 |
| DATED | : October 18, 2022 |
| INVENTOR(S) | : Etienne Iliffe-Moon et al. |

It is certified that error appears in the above-identified patent and that said Letters Patent is hereby corrected as shown below:

In the Claims

Column 16, Line 20 (Claim 12), please strike the "-" in "comprises-rotating".

And

Column 16, Line 21 (Claim 12), please strike the "-" in "object-about".

Signed and Sealed this
Eighteenth Day of April, 2023

Katherine Kelly Vidal
*Director of the United States Patent and Trademark Office*